C. B. WINDER.
Seed Planter.
No. 18,717.
Patented Nov. 24, 1857.
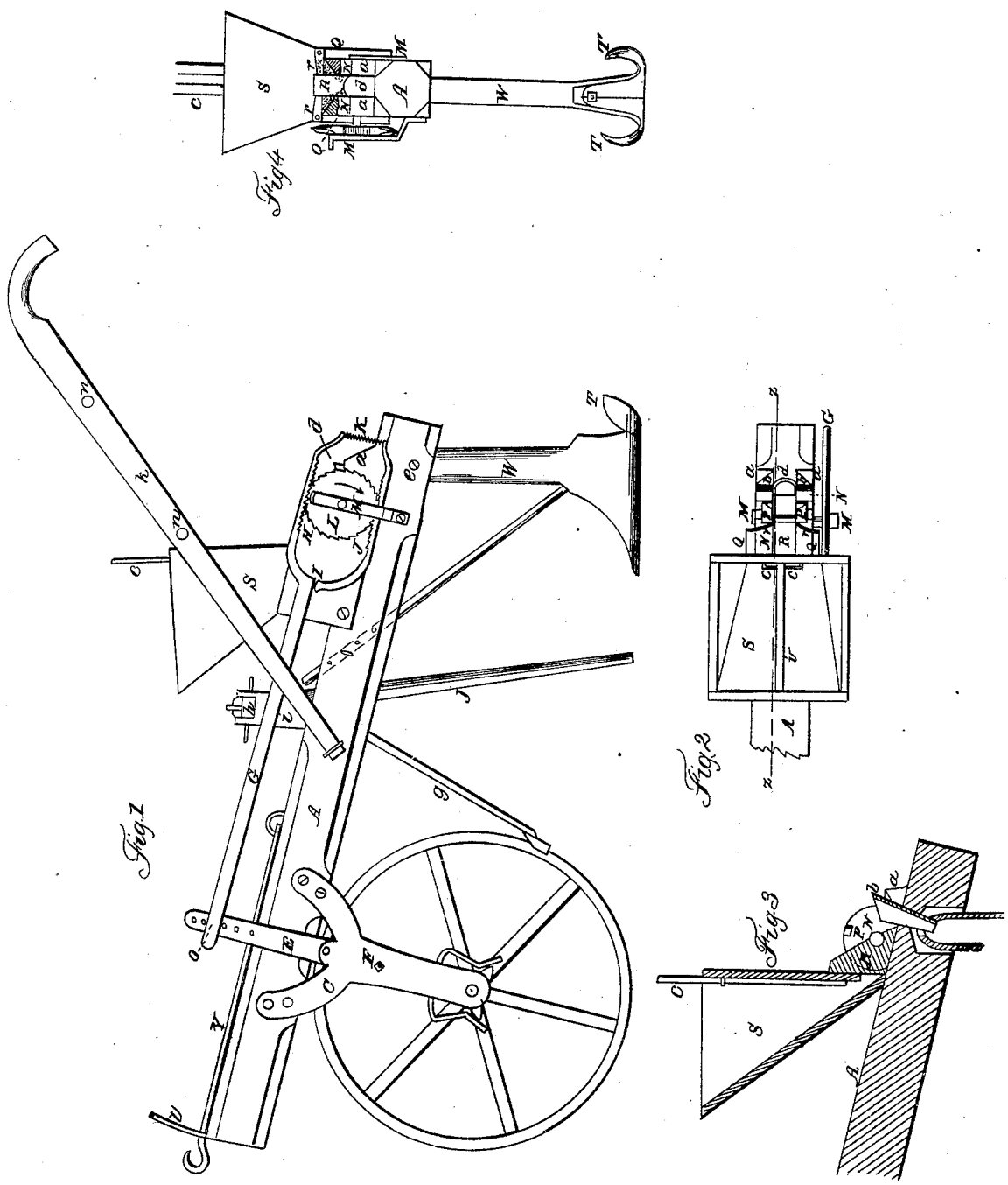

UNITED STATES PATENT OFFICE.

CALEB B. WINDER, OF NORTH LEWISBURG, OHIO.

IMPROVEMENT IN SEED-PLANTERS.

Specification forming part of Letters Patent No. 18,717, dated November 24, 1857.

*To all whom it may concern:*

Be it known that I, CALEB B. WINDER, of North Lewisburg, in the county of Campaign and State of Ohio, have invented certain new and useful Improvements in Seed-Planters; and I do hereby declare that the same are described and represented in the following specifiaction and drawings.

To enable others skilled in the art to make and use my improvements, I will proceed to describe their construction and operation, referring to the drawings, in which the same letters indicate like parts in each of the figures.

Figure 1 is an elevation of a planter with my improvements. Fig. 2 is a top view of the seed-box and roller. Fig. 3 is a section through the line $z\ z$ of Fig. 2. Fig. 4 is an elevation of the rear of the planter.

In the accompanying drawings, A is the beam, and B the driving-wheel, having an axle turning in stands fastened to the beam like the one shown at C.

The three-leaved cam D is turned by the wheel B and vibrates the forked lever E on the stud F in the stand C, and traverses the shackle-bar G, which is made in the form shown in the drawings—that is, the upper part is made rigid and provided with ratchet-teeth H, and the lower part is jointed to the upper at I, so as to vibrate, and is provided with a rack of ratchet-teeth, J, on its upper side, and its extremity is connected to the upper part by the spring K, which draws the two racks H and J against the ratchet-wheel L to turn it as the bar and racks are traversed back and forth by the lever E. The teeth of the racks are formed so that when one turns the wheel the other slips over the teeth on the wheel, acting alternately to turn the wheel in the direction indicated by the arrow.

The shaft of the ratchet-wheel turns in the stands M M, fastened to the beam A, and the seed-delivering wheels N N are fastened to this shaft and turned by it. The sides of the wheels N N are parallel and the periphery at right angles to the sides, and the seed-scores P P are cut diagonally across the corner of the side and periphery, as shown in the drawings. These wheels turn between the side pieces, Q Q, and center piece, R, (which are fastened to the beam A,) and receive the seed from the box S into the scores P P, and carry it up by the side of the center piece until it passes the edge of the same, when it slides out of the score in sight of the operator and passes down through the furrowing-tooth into the furrow, and is covered by the earth taken from the furrow by the tooth and turned back into the furrow again by the rear ends of the shares T T, which extend back behind the shank of the tooth, and are turned up for that purpose.

The seed-box is made in the form shown in the drawings, with an inclined front, so as to deliver the seed to the rollers or wheels as long as a kernel remains. This box is provided with a partition, U, so as to plant seed and deposit some kind of a fertilizer with it, or plant two kinds of seed, either in the same hill or alternate hills by changing the position of one of the rollers, so as to bring the scores in it opposite the spaces in the other. There may be some pieces of leather, $v\ v$, fastened to the rear corners of the pieces Q Q to prevent the seed from being spilled over outside of the rollers. The pieces $a\ a$ are fastened to the beam behind the rollers, and their upper surfaces, $b\ b$, inclined diagonally, so as to catch any seed which is carried over by the roller and deliver it to the roller again, so that it is carried around into the seed-box.

The slides $c\ c$ in the seed-box may be pushed down, so as to shut the seed from the rollers, or adjusted, so as to graduate the supply of seed, as desired; and whenever it is desirable to stop the rollers the rack H may be moved from the wheel L onto the top of the stand, so that the rollers will not deliver any seed until the rack is put upon the wheel again. The curved plate $d$ is fastened to the beam behind the center piece, R, to guide the seed into the shank of the furrowing-tooth W, which is arranged to vibrate in the beam on the screw $e$, and may be set so as to run deep or shallow by the brace X, which extends through the beam and is provided with several holes for that purpose.

The furrowing-tooth is made in the form shown in the drawings, and the shares extend back behind the shank of the tooth, and are turned upward and their rear ends inclined inward, so as to return the earth taken out of the furrow into it again to cover the seed.

The draft-rod Y is connected to the beam behind the center of the wheel B, and arranged to vibrate in the clevis yoke or staple $f$, fastened to the end of the beam, so that a sudden jerk will not lift the wheel from the ground and allow it to stop, so that no seed will be delivered. The scraper $g$ is fastened to the beam to scrape the dirt off that adheres to the wheel B. The bar $h$ is hinged to the stand $i$ on the beam, and may be turned either way, so as to drag the marker $j$ on either side of the planter to mark the proper distance for the next furrow.

The handles $k\ k$ are connected to the seed-box by one of the bars $n\ n$, and are fastened to the beam, as shown in the drawings.

In using this machine the operator has an opportunity to see each charge of seed as it passes into the furrowing-tooth. There is no brush used; neither are the seed liable to be crushed in passing from the seed-box, as the rear is a little distance from the surface of the roller.

I believe I have described and represented my improvements in seed-planters so as to enable any person skilled in the art to make and use them. I will now state what I desire to secure by Letters Patent, to wit:

1. The inclined planes, arranged to catch the seed carried or thrown over by the roller and deliver it to the roller again, so that it will carry it back to the seed-box, substantially as described.

2. Connecting the draft-rod to the beam at the rear of or behind the wheel, in combination with the clevis yoke or staple, which allows it to vibrate, as described.

CALEB B. WINDER.

Witnesses:
J. DENIS, Jr.,
JOHN S. HOLLINGSHEAD.